Inventors
Kingsley E. Humbert, Jr.
Ralph L. Young
Lewis M. Hough, Jr.

ATTYS.

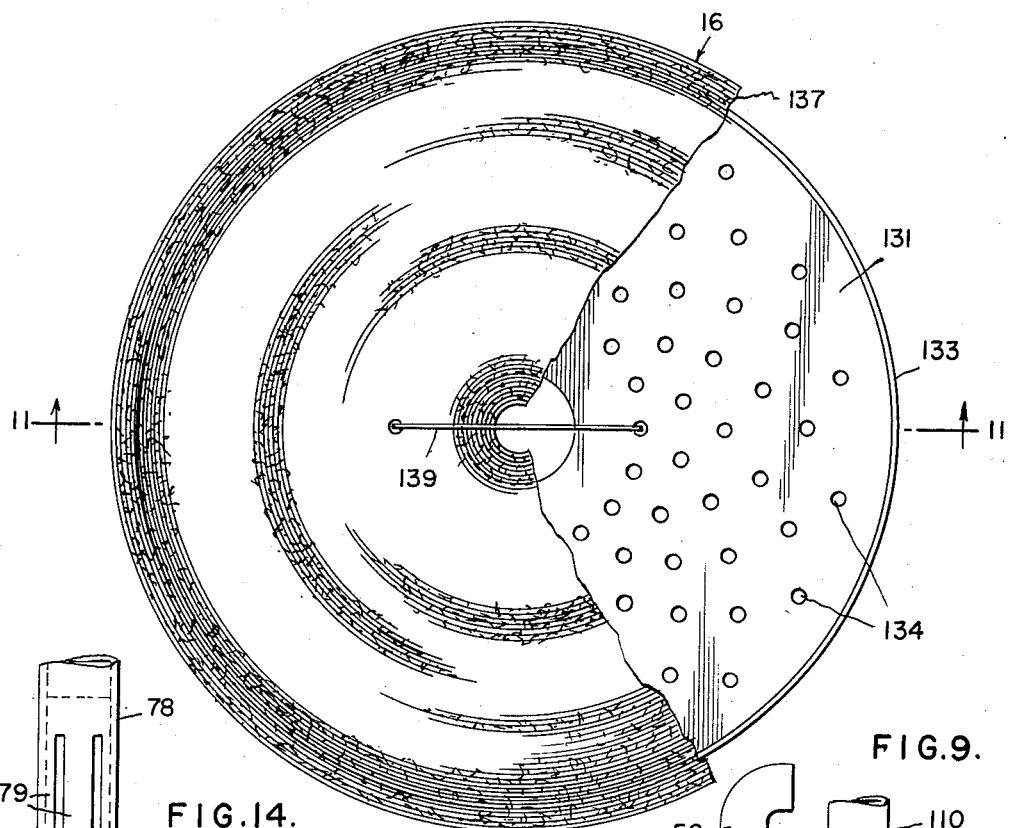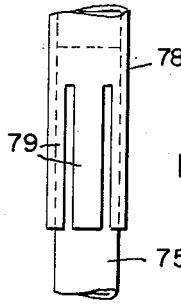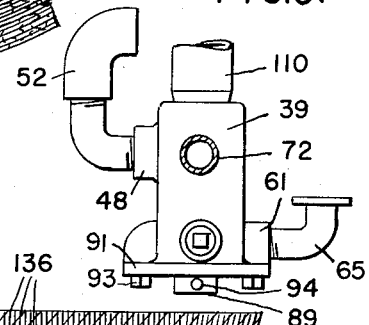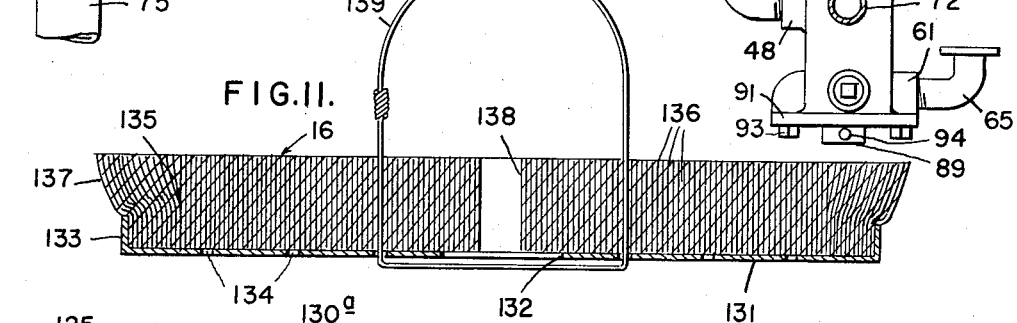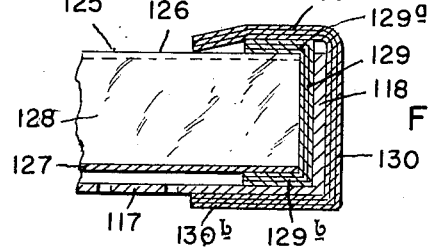

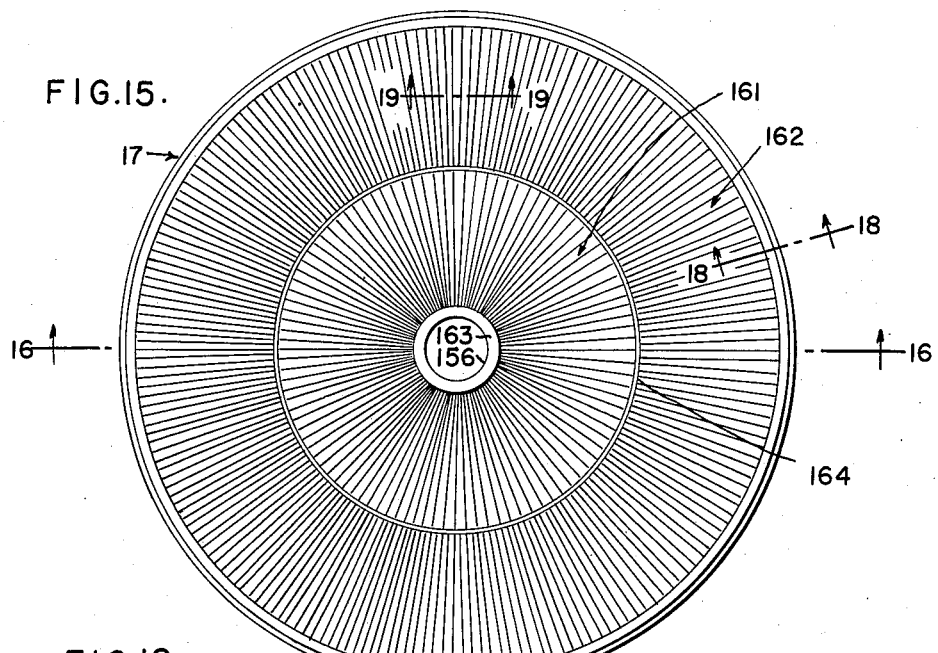
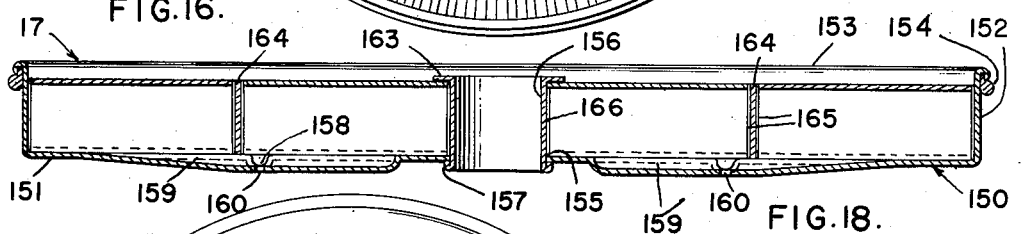
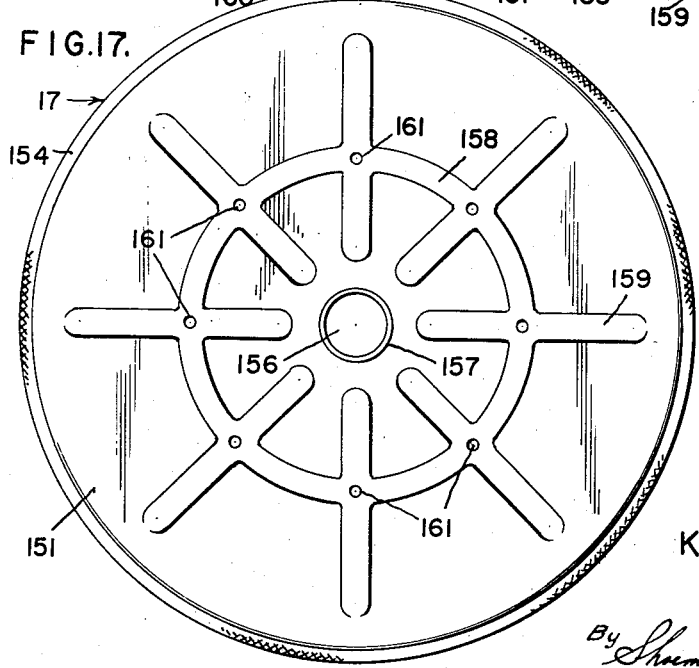
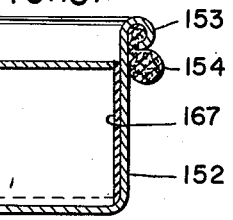
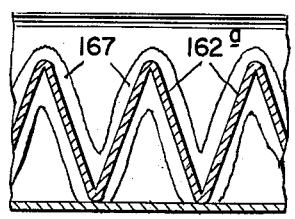
Inventors
Kingsley E. Humbert, Jr.
Ralph L. Young
Lewis M. Hough, Jr.

United States Patent Office 2,902,161
Patented Sept. 1, 1959

2,902,161

PORTABLE FILTER FOR REMOVING CONTAMINANTS FROM FLUIDS AND FILTER CARTRIDGE THEREFOR

Kingsley E. Humbert, Jr., Ralph L. Young, and Lewis M. Hough, Jr., Gastonia, N.C., assignors to Wix Corporation, Gastonia, N.C., a corporation of North Carolina Application January 10, 1955, Serial No. 480,826

12 Claims. (Cl. 210—416)

This invention relates generally to filtering devices for fluids or liquids and is directed particularly to an improved compact portable filter and a novel replaceable filtering cartridge therefor.

The present invention is directed to a novel compact portable filter, and replaceable filtering unit therefor, for use in removing contaminants from various types of fluids such as cooking oils, hydraulic oils, fuel oils, lube oils, machine oils and so forth.

In many business establishments use is made of oils, and other liquids, which after a period of use accumulate certain contaminants which if removed will restore the oils to their former usable condition so that such oils can be used over a long period of time whereas if no suitable means is provided for removing such contaminants the useful life of the oil is materially shortened. For example, in restaurants, particularly large restaurants, where deep fat frying is practiced, the fat or oil after a number of uses, becomes darkened with minute particles of food materials and may contain numerous particles of carbonized food which, after awhile, make the oil unfit for further use whereas if the oil can be easily and quickly strained or filtered to remove the discoloring materials and the carbonized food particles its value will be restored.

In other establishments where oils or other liquids are used over and over again such means for easily and quickly filtering the oils or other liquids is highly desirable.

In the light of the foregoing it is a particular object of the present invention to provide a portable filter structure which, when required for use, can be easily placed in close proximity to the container or receptacle in which is the oil to be filtered and drawn from such receptacle, filtered and returned thereto quickly with the minimum of effort and in a condition where it is thoroughly clean and ready for reuse. Thus the necessity for extracting the oil or other liquid from the receptacle in which it is used or from which it is drawn for use and then returned, and transporting the oil to some remote point for cleaning treatment is avoided since the filtering can be done with the device of the present invention right at the receptacle in which the oil or other liquid to be cleaned is contained.

It is a further object of the present invention to provide a portable filter structure wherein all of the elements necessary for withdrawing oil or other liquid from a receptacle, passing it through the filter and returning it to the receptacle are arranged in a compact assemblage upon an easily movable platform whereby, as above set forth, a desired filtering operation can be carried out right at the container in which the liquid to be filtered is located.

More specifically the invention is directed to a portable filter structure wherein the oil or other liquid to be filtered is introduced into a large capacity receptacle forming a part of the unit, upon one side of a filter cartridge therein and drawn through the filter cartridge to the opposite side thereof from which it is removed to be returned in clean condition to the receptacle from which it was withdrawn.

In a portable filter structure of the character embodying the present invention it is desirable that the filtering unit be of such character and associated with the structure in such a manner that it may be easily and quickly removed for replacement by a new or clean filter unit or cartridge. It is accordingly another object of the invention to provide a filtering structure including a receptacle into which the oil or other contaminated liquid is introduced and from which it is withdrawn after being filtered wherein such receptacle has a removable top or cover and wherein a filter cartridge of novel construction is provided which can be introduced into the receptacle through the top to have tight peripheral contact with the wall of the receptacle whereby to substantially partition the receptacle, the cartridge being designed to coact with an inlet tube for the contaminated liquid whereby such liquid is introduced into the receptacle upon the upper side of the partitioning filter cartridge and withdrawn from the receptacle from below the filtering cartridge after having been drawn through and cleaned by the latter.

A further and more specific object of the invention is to provide a portable filtering structure wherein a cylindrical contaminated liquid receiving tank or receptacle has an axially disposed contaminated liquid inlet tube therein with an end of the tube extending through the bottom of the receptacle for connection with the supply source and an outlet nipple attached to and opening through the bottom of the receptacle and extending downwardly therefrom for connection with a conduit by which the cleansed liquid is discharged, in association with a flat filter disc of novel construction having an overall diameter approximately equaling the inside diameter of the receptacle in which it is placed in a plane perpendicular to the axis of the receptacle with its periphery in tight frictional contact with the receptacle wall and having a central opening adapted to receive the said inlet tube whereby the filter cartridge when introduced into the receptacle is slipped over the liquid admission tube with which it has tight frictional engagement so that inflowing contaminated liquid will be discharged in the receptacle above the filter cartridge and must be drawn downwardly therethrough into the lower part of the receptacle for removal through said nipple.

Still another object of the invention is to provide in a structure as above set forth a receptacle of the character stated which is removably supported on a mobile base over a pump, a motor for operating the pump and a valve unit by which the flow of liquid is controlled into the receptacle and out therefrom, with novel means for establishing a fluid tight coupling between the lower ends of the inlet tube and the outlet nipple whereby the receptacle when placed into position on the mobile base will have the tube and nipple automatically connected with the valve unit and may be removed merely by lifting it from the base.

In the filtering of oils and other liquids such, for example, as large quantities of a cooking oil, where the oil is to be filtered at the place of use it may be desirable to filter it while hot and if, in order to filter the oil it should be necessary to transport it from the place of use to some other location for the filtering operation it would obviously be inconvenient and possibly dangerous to filter it in hot condition and accordingly the filtering job could not be done until the oil was sufficiently cool. It is a further object of the present invention in the light of the foregoing to provide a portable filter structure which is so designed that the oil or other liquid to be filtered can be extracted directly from the container holding it and run into the receptacle of the filtering structure where it can be held while the original container is being cleaned for the return of the filtered oil, after which the oil can be extracted from the filtering structure and returned to its original container in cleaned filtered condition. To accomplish this object there is provided upon the mobile base below the romovable receptacle a novel valve structure with which is connected an end of the hose line on the other end of which is carried an intake nozzle designed to be introduced into a receptacle in which is contained the contaminated oil or the liquid which is to be filtered. A motor operated pump connected with the valve effects the withdrawal of the liquid through the valve and its discharge into the receptacle housing the filter cartridge. A conveniently located valve plug operator enables the user of the filtering device to turn the valve plug to one position whereby the liquid will be withdrawn from its container and introduced into the filtering receptacle as described and held there until it is to be withdrawn through the filter for return to its source, which is accomplished by turning the valve to a second position whereby the pump when operating will withdraw the liquid from the filter receptacle and pass it back through the hose and nozzle in cleaned condition to the original or any other container.

The present invention has for still another object to provide a novel filter cartridge adapted to position in the filter receptacle in sealing contact around its periphery with the wall of the receptacle and in sealing contact between an opening formed therethrough and the contaminated liquid introducing tube, whereby said cartridge partitions the filter receptacle into an upper chamber or area receiving the contaminated liquid and a lower chamber or area from which the liquid is withdrawn in cleaned condition after being passed through or drawn through the cartridge.

More specifically the invention contemplates the provision of a cartridge of the above described character, one embodiment of which is in the form of a disc or flat annulus of folded or pleated filter paper wherein the fold lines lie substantially radial with respect to the disc and the container and the pleats have an angular relationship with a plane lying perpendicular to the axis of the cartridge, the peripherly of such disc or flat annulus lying in an inwardly facing channel of an encircling band of filter material which is designed to have tight sliding contact with the wall of the filter receptacle or container. In another embodiment of the novel disc cartridge the filter media comprises a spirally wound absorbent material whereby the cleaning of fluid passing therethrough is effected by the myriad cells in the material and between the layers of the material, where such material is of an absorbent nature or, where the material may be of non-absorbent material, the fluid is cleaned in passing between the closely spaced or compacted layers of such material.

The invention will be best understood from a consideration of the following detailed description taken in connection with the accompanying drawings forming a part of the specification, with the understanding that the invention may be changed or modified so long as such changes or modifications mark no material departure from the appended claims.

In the drawings:

Fig. 4 is a sectional view taken in a horizontal plane substantially on the line 4—4 of Fig. 2 and on a reduced scale.

Figure 2:
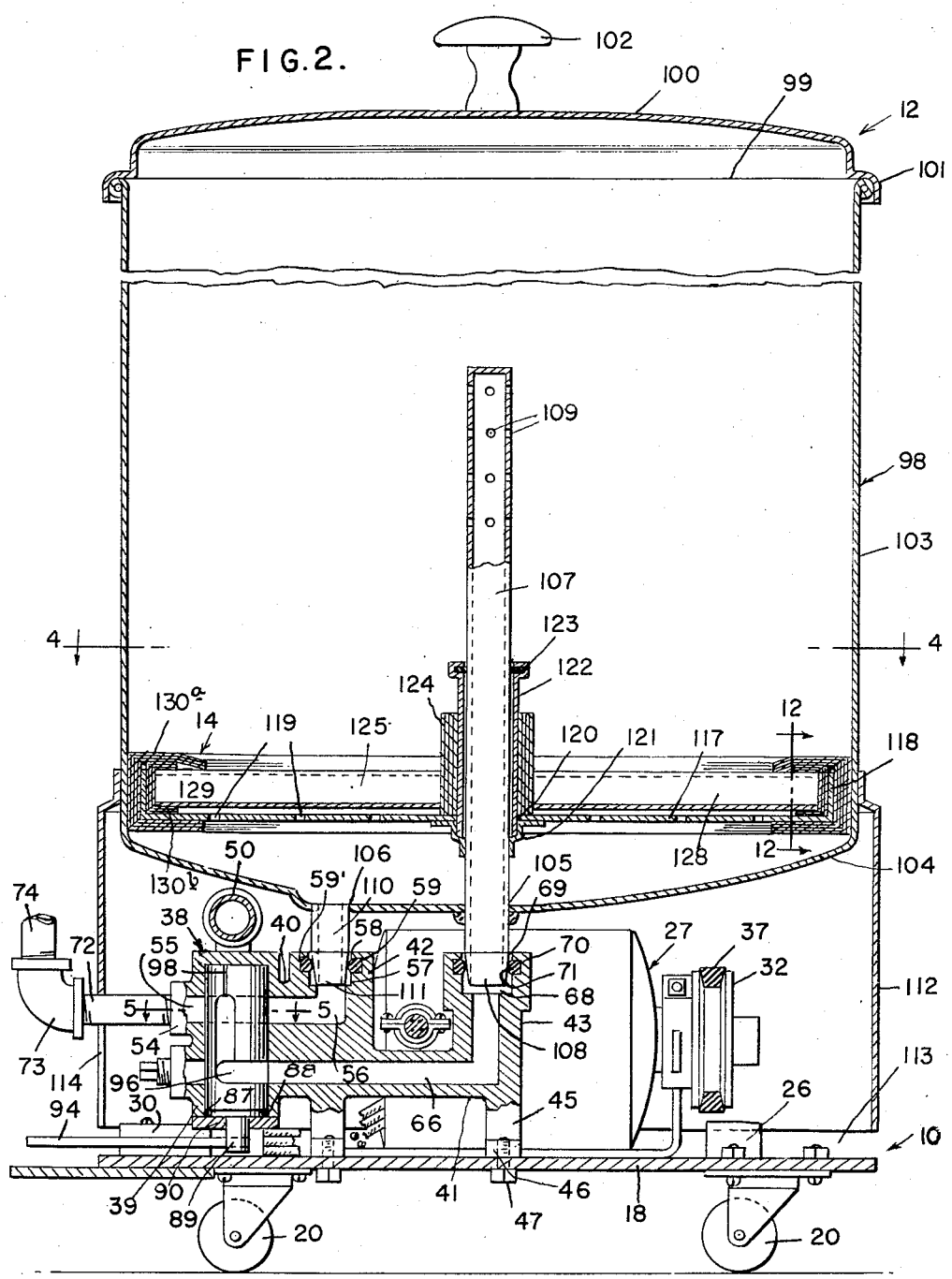
Fig. 2 is a vertical sectional view taken substantially in the plane of section line 2—2 of Fig. 1, the view being on an enlarged scale.
Figure 7:
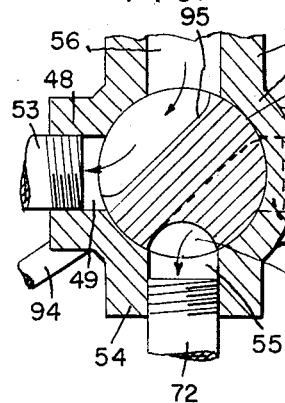
Figure 6:
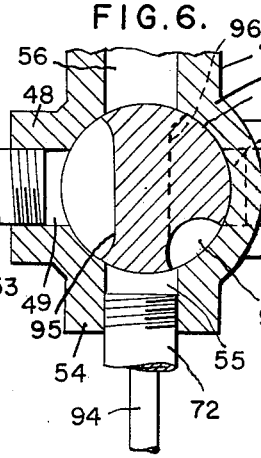
Figure 5:
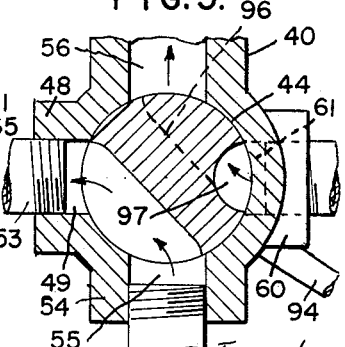

Figs. 5, 6 and 7 are sections taken on the line 5—5 of Fig. 2 illustrating the three different positions for the rotary plug of the control valve which represent respectively the valve position for drawing liquid through the hose to the pump and discharging it into the filter receptacle; the middle position in which the valve is closed to shut off all flow of fluid in the system, and the position of the valve whereby the filtered liquid may be drawn from the filter receptacle and discharged from the system.

Fig. 8 is a view in perspective of the rotary valve plug per se.

Fig. 9 is a view in front elevation of the valve unit showing the location of the connections in the top of the unit whereby liquid may be drawn into the valve structure or discharged therefrom and whereby the liquid flows through the valve to the pump and in the lower section showing the connection whereby the liquid flows from the pump to the valve.

Fig. 10 illustrates a view in top plan of one embodiment of the filter cartridge, a portion of the filter material being broken away to show the underlying perforated supporting plate.

Fig. 11 is a transverse section taken substantially on the line 11—11 of Fig. 10.

Fig. 12 is a detail section taken substantially on the line 12—12 of Fig. 2 through a portion of the embodiment of the filter cartridge illustrated in the receptacle showing the inclined disposition of the radial pleats.

Fig. 13 is a sectional view taken substantially on the line 13—13 of Fig. 4, the same being on an enlarged scale.

Fig. 14 is a detail view illustrating the finger formation of the end of the nozzle into which an end of the hose extends.

Fig. 15 is a view in top plan of another embodiment of the filter cartridge, wherein concentric pleated filter elements are employed.

Fig. 16 is a transverse section taken substantially on the line 16—16 of Fig. 15.

Fig. 17 is a view in bottom plan of the cartridge shown in Fig. 15.

Fig. 18 is a sectional detail taken substantially on the line 18—18 of Fig. 15.

Fig. 19 is a sectional detail taken substantially on the line 19—19 of Fig. 15.

Figure 1:
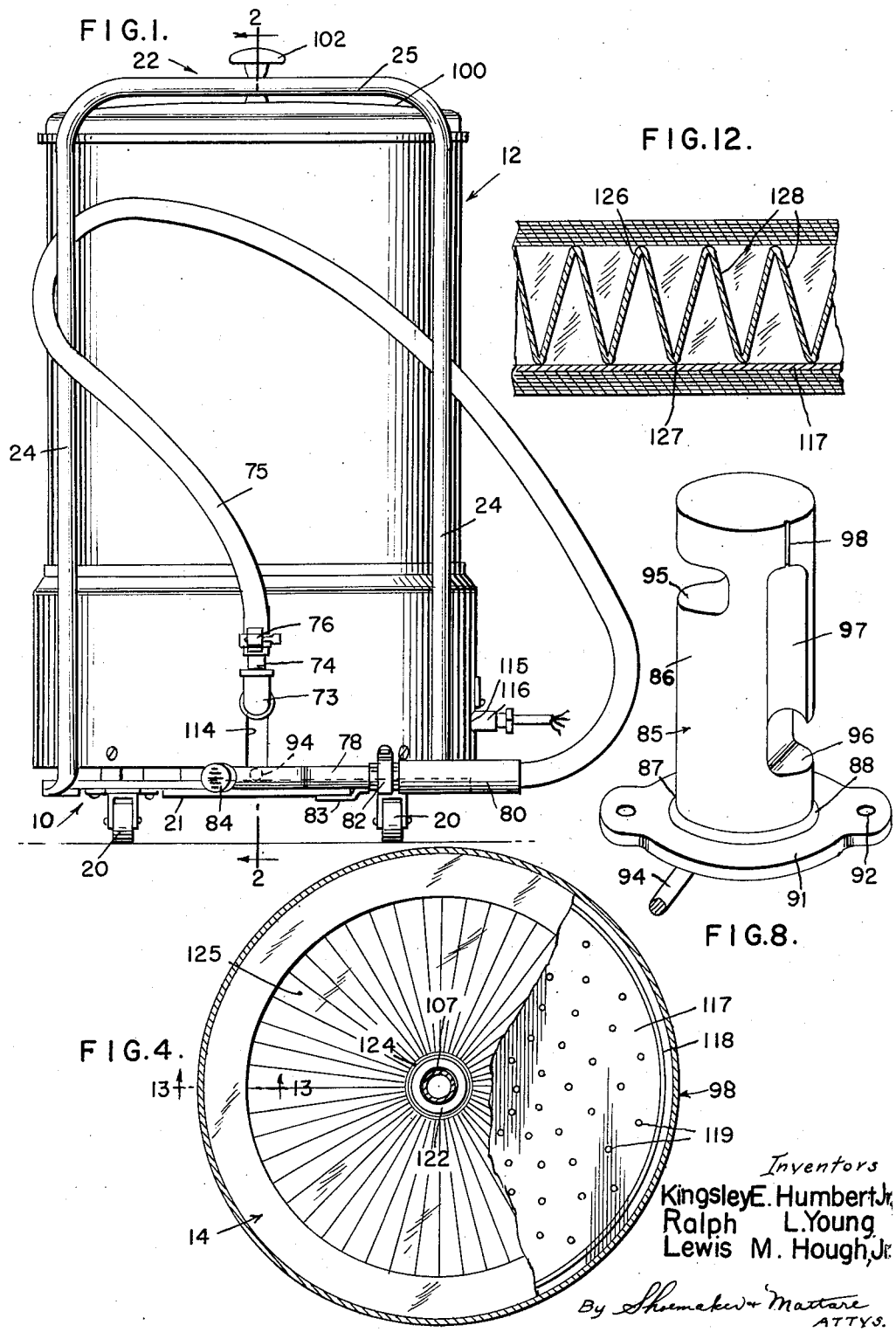
Fig. 1 is a view in elevation of a portable filter constructed in accordance with the present invention, looking at the rear side thereof.

Referring now more particularly to the drawings it will be seen upon reference to Fig. 1 that the portable filter structure of the present invention broadly comprises two readily separated portions which are a mobile base 10 and a receptacle or tank 12 in which is housed the removable and replaceable filter cartridge, one embodiment of which is illustrated in the receptacle in Figs. 2 and 4 and is generally designated 14 while second and third embodiments, which are adapted to be positioned in the receptacle in the same manner as the first embodiment 14, and in place thereof, or substitution therefor, are illustrated in Figs. 9 to 19 and are respectively designated 16 and 17.

Figure 3:
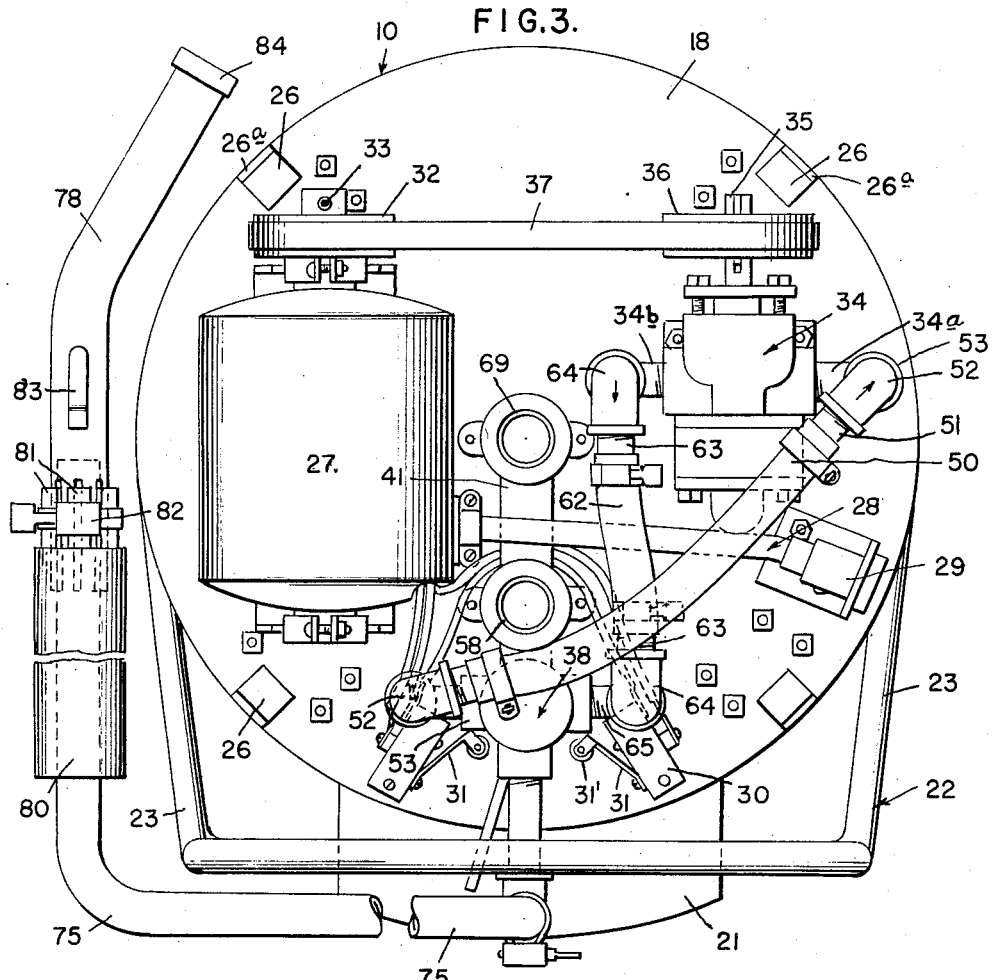
Fig. 3 is a view in top plan of the wheel or caster supported base with the filter receptacle removed therefrom, showing the operating motor, the pump, the valve and associated parts, the view being on an enlarged scale.

Referring now more particularly to the mobile base unit which is best illustrated in Figs. 2 and 3 together with the several parts which are fixed thereto, it will be seen that this unit comprises a platform or base plate 18 mounted upon suitable supporting caster rollers 20 whereby the base can be readily moved from place to place. This base or platform is preferably of circular outline and has secured thereto and projecting rearwardly therefrom a short or narrow flange 21, the purpose for which will be hereinafter made clear.

Also secured to the platform 18 is an upstanding handle structure which is generally designated 22 and which comprises two substantially horizontal bottom arms 23 which are secured to opposite sides of the platform as shown in Fig. 3 and extend rearwardly therefrom, the upstanding or substantially vertical bars 24 and the transverse handle bar 25. The vertical bars are each connected to and constitute a continuation of the arms 23 as will be readily apparent while the handle bar 25 connects the vertical bars at their upper ends thereby forming with the latter a substantially U-shaped structure. This handle bar, as shown in Fig. 1, is located at a convenient height to facilitate the movement of the filter and lies approximately at the top of the receptacle or tank portion of the structure.

Disposed upon the top of the platform 18 and equidistantly spaced around the peripheral portion thereof as shown in Fig. 3, are four or more mounting studs 26 upon which the receptacle or tank section of the structure is supported as hereinafter set forth.

The numeral 27 generally designates an electric motor of suitable horse power and designed for operating the pump. The electric cable by which current is run to the motor through the switches hereinafter described, is designated 28 and is connected with a suitable receptacle 29 mounted on the base adjacent to the periphery thereof as shown in Fig. 3 and adapted to have connected therewith a conventional electric cord terminal (not shown) at the other end of which is suitable connector for plugging in the motor with a standard house current outlet. This receptacle faces radially outwardly and suitable means is provided in a portion of the hereinafter described receptacle skirt structure to permit the necessary electrical connection to be made with the receptacle.

Secured to the top of the base or platform at the rear thereof and disposed on opposite sides of a radial line passing across the flange 21 are two micro switches 30 the conventional resilient contact arms 31 of which are on the confronting sides of the switches as shown in Fig. 3 for selective engagement by the hereinafter described valve operating lever and these switches are connected in a conventional manner with the current conducting cable 28 and with the electric motor 27 whereby the application of pressure to the arm 31 of either switch will close the circuit for starting the motor.

Since the wiring for the switches and the motor forms no part of the present invention in itself and may be conventional and readily set up by any electrician no detailed illustration of the circuit or circuits is shown or believed to be necessary.

The numeral 32 designates a belt pulley of suitable character as secured to the shaft 33 of the motor armature.

At the opposite side of the platform from the motor 27 is mounted a gear pump 34 of a standard well known manufacture and the shaft 35 of the pump carries a belt pulley 36 which is operatively coupled by the belt 37 with the pulley 32.

While there has been illustrated and described a belt coupling between the motor and the pump and this connection is preferred, particular preference being had for V pulleys and a V belt, it is to be understood that the invention is not limited to the use of this coupling since any suitable drive connection between the motor and the pump may be employed.

The numerals 34a and 34b designate respectively the intake and discharge nipples for the rotary pump which are connected in the manner about to be described with the control valve for the filter structure.

The novel control valve structure by which the flow of fluid into the filter receptacle and the out flow therefrom is controlled, is generally designated 38. This valve comprises the rotary plug and casing body portion 39 which is substantially cylindrical and adapted to be uprightly disposed for use as shown in Fig. 2, although it is to be understood that this cylindrical form is not essential but is referred to merely for convenience in describing the manner in which the position of the valve body stands.

Formed integral with the valve body 39 is an upper short arm 40 and a lower long arm 41. These arms are disposed up above the other and may be cast or otherwise molded as unitary parts together with the body 38 as will be readily apparent.

The arms 40 and 41 terminate respectively in the upwardly directed extensions 42 and 43, the top ends of which extensions are preferably in the same horizontal plane as shown in Fig. 2.

The body 39 of the valve has the vertically disposed elongate cylindrical plug chamber 44 therein which opens through the bottom of the valve as shown in Fig. 2.

Also cast integral with the valve body, more specifically with the arm 41, are the supporting posts 45 which have the laterally directed apertured ears 46 by which the valve structure is secured to the platform or base by suitable bolts, screws or the like indicated at 47.

On one side of the body 39, here shown as the left side is formed the boss 48 through which is formed the outlet port 49 which is in communication with the inlet port 38 of the pump through a flexible hose coupling 50, the nipples 51 at the two ends thereof and the elbow couplings 52 and nipples 53, the nipples 53 being connected one in the port 49 as shown in Figs. 5–7 and the other with the pump inlet port 38 shown in Fig. 3.

The forward side of the body 39 carries the boss 54 through which is formed the port 55 which functions both as intake and exhaust as hereinafter described. This port is 90° removed from the port 49 and is diametrically opposite the filtered liquid outlet passage 56 which, like the ports 55 and 49 open into the plug chamber 44 in the same horizontal plane and in the upper end of the chamber as shown in Fig. 2.

As is also shown in Fig. 2 the passage 56 is directed upwardly at its outer end and opens through the top of the extension 42 through the enlarged recess 57 which forms a socket 58 in the top end of the extension 42. The wall of this socket is recessed as indicated at 59 and has fitted therein a gasket ring 59' for the purpose hereinafter set forth.

At the lower end of the body 39 there is formed on the side opposite from the boss 48, the boss 60 through which is formed a port 61 which enters radially into the plug chamber. This port is connected with the outlet nipple 39 of the pump by the flexible hose 62, the nipples 63 at the ends thereof and the elbow couplings 64 connected with the nipples 63, one of the couplings being connected with the nipple 39 in the outlet port of the pump while the other elbow coupling 64 is connected with the nipple 65 which is engaged in the port 61.

The valve arm 41 has formed therethrough the receptacle supply passage 66 which lies below and parallel with the receptacle outlet passage 56 and is 90° removed from the port 61 which is connected with the outlet side of the pump. The outer end of this passage 66 extends upwardly through the arm extension 43 and opens into the enlarged socket 68 which opens through the top of the extension 43 as indicated at 69. The wall of the socket 68 has an annular groove 70 formed therein in which is a gasket ring 71, the function of which will be hereinafter set forth.

The nipple 54 of the valve body which is directed radially outwardly with respect to the base or platform 18, has fitted therein the outwardly and rearwardly extending relatively long nipple 72, the outer end of which is connected with the upwardly turned elbow 73 in which is threaded one end of a nipple 74. The upper end of the nipple 74 is fitted into an end of a hose 75 of substantial length as shown in Fig. 1, the end of the hose being tightly secured to the nipple 74 by the band clamp 76.

The other end of the hose 75 has attached thereto a metal nozzle 78 which, as shown in Fig. 2, is preferably angulated by being bent slightly intermediate its ends. The end of the nozzle 78 which is attached to the hose 75, while it may be connected to the hose in any suitable manner, is preferably joined thereto in the manner shown in Fig. 14 where the end of the metal nozzle is divided longitudinally for a portion of its length along a number of lines to form a plurality of terminal fingers 79 and the end of the hose is slipped into this slotted end of the nozzle.

The portion of the hose adjacent the nozzle end is encased in a handle sleeve 80 formed of any suitable insulation material such as wood or the like and the end of this handle sleeve 80 which is nearest to the nozzle 78 is formed to provide a circular series of flexible finger extensions 81 which are disposed around the spaced fingers 79 and around these fingers 81 of the handle there is placed a band clamp 82 of conventional structure which when tightened compresses the finger members 81 of the handle against the finger members 79 of the nozzle.

Upon the inner end of the nozzle, which is the end to which the hose is attached, is secured an end of a tongue member 83 which is spaced slightly from the side of the nozzle body. The free end of this tongue member 83 is directed toward the outer end of the tongue and is designed to facilitate the attachment of the nozzle to the flange 21 by placing the nozzle on the top of the flange and slipping the tongue underneath at one side edge thereof as shown in Fig. 1. By this means when the filter is being moved from place to place the nozzle end of the hose can be secured and, as shown in Fig. 1, it may be wrapped around the handle so that no part of the hose will drag on the floor.

The free or outer end of the nozzle 78 is preferably covered by a slotted strainer cap 84 by which large particles of material are prevented from being drawn into the filter receptacle.

The numeral 85 generally designates the rotary plug which fits snugly in the valve chamber 44 as shown in Fig. 2. This plug comprises the cylindrical body 86 the length of which is approximately the same as the length of the chamber 44. The outer end of the body 86 has a gasket recess 87 formed therein in which is placed the gasket annulus 88 which enters the chamber 44 at the open end to form a seal against the escape of fluid around the plug body.

The lower end of the plug body has the reduced axially extending stem 89 which extends through an aperture 90 in the center of a closure or cover plate 91 which is adapted to position against the bottom end of the body 39 and is provided with bolt or screw openings 92 to receive the machine screws 93 which pass through and into suitably threaded bores, not shown, in the bottom end of the valve body 39. By this means the rotary valve plug is maintained in position in the valve chamber and the necessary turning of the plug body 86 is effected by the handle bar 94 which has one end secured in a suitable opening in the plate 91 below the same and extends rearwardly beyond the periphery of the base 18 and over the flange 21 as shown in Fig. 3 where it may be actuated in any convenient manner as by the foot of the operator.

Adjacent its top end the valve plug body 86 has formed in the side thereof the transversely directed transfer slot 95. This slot is positioned to lie in the plane of the ports 49, 55 and 56.

Adjacent the lower end of the valve plug body 86 at the opposite side thereof from hte fluid transfer slot 95 is a similar transversely extending fluid transfer slot 96 formed in the side of the body and which lies in the plane of the lower port 60 and the passage 66 as shown in Fig. 2. In addition to the lower fluid transfer slot 96 the wall of the plug body 86 has the longitudinally extending riser channel 97 which at the lower end communicates with the end of the transverse or horizontal slot 96 which is nearest to the side of the chamber through which the port 55 opens and the longitudinal extent of the channel 97 is such that its upper end will register with the port 55 when the plug is turned to the position in which the other end of the slot 96 registers with the port 61. In this position also it will be seen upon reference to Fig. 7 that the fluid transfer slot 95 at the upper end of the plug body 86 registers at its ends with the port 49 and with the passage 56 to establish communication between the two.

The valve handle bar 94 is secured to the stem 89 in a position where it lies in a vertical plane passing between the slots 95 and 96 so that when the handle bar is positioned so that it is disposed in the vertical plane passing through the port 55 and the channels 56 and 66 the valve will be completely closed as illustrated in Fig. 6.

Since the plug body 86 fits snugly in the valve chamber an air release groove 98 is formed in the side face of the body as illustrated in Fig. 8 to prevent compression of air in the upper end of the chamber when the plug is being inserted.

As illustrated in Fig. 3 the valve structure 38 is positioned on the base 18 with the arms extending radially inwardly from the body 39, the upwardly directed opening 69 of the socket 68 being positioned in the center of the base.

The valve handle bar 94 extends outwardly across the edge of the base as previously stated and when the handle bar is disposed in the radial line of the arms or in the central position the valve is closed as previously stated and as is illustrated in Fig. 6.

The micro switches 30 are positioned on opposite sides of the valve handle bar and the inner ends of the switch arms 31 carry heads in the form of small rollers 31' which are adapted to be engaged by the valve handle bar when it is swung from one side to the other. Thus when the valve handle bar 94 is swung over to the left it will close the micro switch on the left side to start the motor and to start the pump operating and in this position the valve will be thus set as shown in Fig. 7 so as to draw liquid from the receptacle and discharge it through the hose. When the valve handle bar is swung all the way over to the right the other micro switch will be closed and the motor will be energized to operate the pump and the valve plug will be in the position shown in Fig. 5 so that the pump will draw liquid from the hose and discharge it through the supply passage 66 in the lower arm 41.

The filter tank or receptacle which is generally designated 12 comprises the tank proper which is designated 98 and which is of circular design as shown, having the open top 99 which is closed by the removable cover 100. The periphery of the cover has the outwardly and downwardly directed flange 101 which engages upon the rolled top edge of the tank and suitable handle means 102 is provided for lifting or handling the cover.

The circular wall 103 of the tank merges with a downwardly depressed or dished bottom wall 104 which has a central opening 105 formed therethrough and a second opening 106 positioned eccentrically a distance equal to the distance between the opening 58 of the socket 57 and the opening 69 of the socket 68.

Extending through the opening 105 and the bottom of the receptacle is the lower end portion of a vertical liquid inlet tube 107 which extends upwardly in the receptacle through the major portion of the height thereof. This pipe is permanently secured as by welding or otherwise in the opening 105 and a lower end portion is tapered slightly as indicated at 108 and adapted to enter the opening 69 and pass through the gasket and tightly compress the same when the tank is set up for use as hereinafter set forth.

The upper end of the tube 107 is closed as shown and the wall of the tube beneath the closed upper end is provided with a plurality of inlet apertures 109.

Fixed in the opening 106 is the upper end of a short liquid outlet nozzle 110, the lower end of which is tapered as indicated at 111 to enter the opening 58 of the socket 57 and pass through and compress the gasket 59 therein to form a tight seal when the tank is set up in operative position.

The bottom end of the tank 98 is located within the upper part of a short circular wall or skirt 112 and is secured therein as by welding or other suitable means. The bottom edge of this wall or skirt 112 is of proper circumference to position around the mounting blocks 26 and rest upon the shoulders 26a which are formed in the outer side of each block so that the bottom edge of the wall 112 through the major portion of its extent is spaced slightly above the base 18 providing a ventilation opening as indicated at 113. The height of the wall 112 is properly determined to permit the tapered ends 108 and 111 of the inlet pipe 107 and outlet nozzle 110 respectively to enter the sockets at the inner ends of the valve body arms and press tightly into the gaskets therein so as to form fluid tight joints. Thus the wall 112 forms in association with the tank bottom 104 and the base 18, an annular housing for the motor, pump, valve and other elements.

The wall 112 is provided with a vertical slot 114 at the proper location to receive the nipple 72 as shown in Fig. 2 and it is also provided at the proper location with an opening 115 which aligns with the electrical receptacle 29 so that an electric cord attachment plug 116, Fig. 1, may be inserted into the receptacle.

Disposed within the lower part of the tank 98 is the filter cartridge designated 14 or in the same position a cartridge of the modified form shown in Figs. 9 and 10 and designated 16 may be positioned. Both of these cartridges are of disc form and of an overall diameter to fit snugly concentrically within the tank as is illustrated in Figs. 2 and 4 in connection with the cartridge 14.

Each of these cartridges comprises a flat body of suitable filter material centrally apertured to slip over the pipe 107 and carried upon an apertured base disc or plate.

Referring specifically to the filter cartridge 14 shown in Figs. 2, 4, 12 and 13 there is shown a thin base disc 117 which has an upturned peripheral flange 118 and which is provided with a multiplicity of apertures 119. The center of the disc 117 has an opening 120 therein and secured to the underside of the disc concentric with the opening is a downwardly extending collar 121 the lower end of which is of an inside diameter to snugly receive the pipe 107 while the upper portion is of slightly larger diameter corresponding to the diameter of the opening 120.

Extending through the opening 120 and into the upper part of the collar 121 is the lower end of a metal tube 122 which rises a substantial height above the plane of the top edge of the disc flange 118.

The upper end of the tube 122 has fitted therein a gasket 123 which when the filter is in position tightly encircles the pipe 107 as illustrated.

Surrounding the tube 122 is an upstanding sleeve 124 which is formed of a multiplicity of layers of suitable filter paper or other filtering material and resting upon the disc 117 and encircling the sleeve 124 is a radially fluted filter annulus 125 which closely engages in its center opening about the sleeve 124 with the inner edges of the flutes pressing against the sleeve while the outer edges of the flutes are in opposed relation with the flange 118.

Fig. 12 shows a detail section on an enlarged scale of a portion of the fluted annulus 125 wherein the top and bottom edges of the flutes are designated 126 and 127 respectively while the faces of the flutes which form alternate upright and inverted V's are designated 128 and, as shown, are at an inclination to the horizontal.

Encircling the fluted annulus 125 is a band made up of a number of layers of filter material which band is designated 129 and, as shown, lies against the outer end edges of the flutes and has upper and lower edge portions 129a and 129b turned in to lie over the top and bottom edges of the flutes. This band 129 is interposed between the outer end edges of the flutes or the peripheral portion of the fluted annulus and the upturned flange 118 of the disc 117.

Upon the outside of the flange 118 and completely encircling the latter is an outer relatively thick band of filter material which is generally designated 130 and which may be made up of a multiplicity of layers of filter paper or other absorbent filter substance or a non-absorbent substance as may be desired and this band has upper and lower inturned edge portions 130a and 130b which lie upon the top and bottom edges of the flutes as shown in Fig. 13. Suitable adhesive may be employed for maintaining the filter bands 129 and 130 in position and the outer filter band 130 functions as a packing ring between the flange 118 and the inner wall of the tank when the filter cartridge is inserted therein so that no fluid can pass between the filter cartridge and the tank wall.

The filter cartridge 16 like the cartridge 14, includes in its structure a flat base disc 131 of relatively thin material, having a central opening 132 and an upturned surrounding flange 133. In addition to the central opening the disc 131 is provided with a multiplicity of smaller openings 134 for the passage of fluid therethrough.

The disc 131 forms a supporting tray or pan for the filter material 135 positioned on top thereof and maintained in place by the flange 133 and in this embodiment the material 134 is in the form of a band of a width approximately twice the height, or slightly more, than the flange 133 and this material is spirally wound to form the substantially solid annulus made up of the spiral layers 136 and such annulus is initially of an overall diameter somewhat greater than the diameter of the flange 133 and is tightly compressed within the flange so that a portion of the filtering material annulus expands or bulges slightly beyond the flange 133 as indicated at 137.

In the formation of the annular filter body 135 there is provided the central opening 138 which is adapted to snugly receive the inlet pipe 107 when the cartridge is placed in position in the tank 98. This opening 138 is somewhat smaller than the diameter of the pipe so that a tight engagement will be effected between the material of the filter body and the pipe and to permit this the opening 132 of the disc 131 is made materially larger than the opening 138 of the filter body.

To facilitate withdrawal of the cartridge unit 16 from the liquid tank a wire bale handle 139 may be provided by running a length of wire downwardly through the filter material and through one of the apertures 134 then carrying it across the center of the cartridge to an aperture 134 on the other side of the opening 132 and passing it back upwardly through the filter material and then connecting the ends of the wire together in the manner shown. While this specific form of means has been illustrated for removing the filter cartridge from the tank it is to be understood that any other suitable means may be employed if desired.

As previously set forth in connection with the cartridge 14 when this is placed in the tank 98 the upper end of the pipe 107 is caused to slide upwardly through the collar 121, the tube 122 and the gasket 123 and the unit is pressed down into the tank until it is well below the apertures 109. The diameter of the cartridge is such that when it is inserted in this manner the band 130 will be pressed tightly against the wall of the tank as previously stated.

In inserting a cartridge constructed as illustrated in Figs. 10 and 11, and designated 16, the expanding or building portion 137 of the filter annulus will be pressed in the same manner against the wall of the tank. In this construction the overall diameter of the disc flange 133 may be only slightly less than the inside diameter of the tank so that the bulging portion 137 will be forced or compressed inwardly when the cartridge is placed in position and thus the same fluid tight contact will be had with the wall of the tank for the purpose stated.

The third embodiment of the filter cartridge, generally designated 17, is designed for rapid fluid flow, by reason of the novel form of the bottom of the unit upon which the fluted filter paper, or fluted filter sheet material, is supported. It also provides a larger total area of filter surface by the novel concentric arrangement of two annular fluted bodies in the manner hereinafter set forth.

In this third embodiment the cartridge comprises a circular pan 150 in which the filter material is carried. This pan comprises the bottom 151 and vertical wall 152, the top edge of which is outwardly rolled as at 153.

The overall diameter of the pan 150 is slightly less than the inside diameter of the tank 98.

In this construction the desired tight seal is obtained between the peripheral portion of the pan by the provision of a soft packing gasket annulus 154 which encircles the wall 152 below the rolled rim 153 as shown. While any suitable means may be employed to secure the gasket in position, one such means consists in clamping a portion of the gasket in the rolled bead or rim, as the latter is turned, so that a part of the gasket material is enclosed in the bead and the gasket hangs below the same.

When this cartridge is placed in the tank the gasket will be tightly compressed between the tank wall and the pan wall.

The pan bottom is provided in the center thereof with an opening 155, in which is secured one end of a guide tube 156, the function of which will be hereinafter set forth. The lower end of this tube is rolled or turned out as at 157 to secure it against withdrawal upwardly.

To facilitate free and rapid flow of liquid from the pan after passing through the filter material therein, the bottom 151 is pressed downward to form an upwardly opening annular gutter 158, and a plurality of radial, straight channels 159 which cross or intersect the gutter and which start adjacent to the pan wall 154 and gradually decrease in depth toward their inner ends, or toward the pan center.

The gutter 158 and the radial feeder channels 159 are of the same depth where they cross, or intersect, and at each such location an outlet aperture 160 is formed for drainage.

Arranged concentrically in the pan, concentric with the tube 156, are the two annular, flat filter elements 161 and 162.

The inner element 161 closely, or snugly, encircles the tube 156 and the top edge portion of the tube is outturned to form the flange 163 which lies upon the top of the filter element as shown in Fig. 16.

Both filter elements are radially fluted, whereby there are formed the angularly related and steeply inclined fluted walls 162ª, as shown in Fig. 19, which illustrates a section of the outer element 162. It will thus be apparent that the flutes of the outer element 162 have outer end edges, opposing the pan wall 152, and inner end edges which oppose, but do not coincide with, outer end edges of the flutes of the inner element 161. The inner element flutes have end edges opposing the tube 156 from which they radiate.

Positioned in the pan upon the bottom thereof between the opposing edges of the flutes of the inner and outer filter elements, is the annular division wall, or fence, 164.

The ends of the flutes of the filter elements which oppose and abut the division wall, or fence, 164, are cemented as at 165 to the wall by a suitable adhesive such as an oil and water insoluble resin, or any other desirable or suitable adhesive.

The inner end edges of the flutes of the element 161, and the outer end edges of the flutes of the element 162 are likewise cemented respectively to the outer surface of the tube 156, as indicated at 166, and to the inner surface of the wall 152, as indicated at 167.

It will be seen from the foregoing that while the third embodiment of the filter cartridge just described, includes two flat pleated, or fluted, filter elements, the concentric relation thereof, with the bonding of the elements together, forms a single or unitary filter disk analogous to the first and second described embodiments. However, by the provision of the two separate filter elements a larger number of flutes may be provided in the outer element than in the inner one, and accordingly a larger total filter area is obtainable than could be had with a single sheet of filter material in which the flutes run from the center tube to the outer wall of the pan.

While the third embodiment of the filter cartridge has been illustrated as embodying the two concentric filter elements it will, of course, be obvious that the pan in the form shown may be employed to carry filter elements of the character shown in Figs. 4 and 10.

It is believed to be readily obvious that the filter cartridge 17 is designed to be inserted in the tank 98 by sliding the tube 156 down on the inlet pipe 107, either to the lowermost position, as the cartridge 14 is shown in Fig. 2, or to any intermediate position in the tank. When so positioned in the tank the gasket annulus 154 will be compressed between the pan wall and the tank wall to prevent liquid passing between these walls. The fit between the tube 156 and the wall of pipe 107 is close enough to prevent fluid passing between these parts. Thus all liquid will be forced to flow through the material of the filter element, or elements.

In the operation of the present invention if it be assumed that a quantity of deep fat contained in a cooking receptacle has become discolored and filled with carbon particles so that it cannot longer be used in such condition, the filter of the present invention may be moved to a position adjacent to said cooking receptacle and the strainer end of the nozzle 78 introduced into the liquid. By then swinging the valve handle bar 94 to the right, after, of course, connecting the receptacle 29 with a suitable source of electric current supply, the valve plug will be turned to the position illustrated in Fig. 5 and the engagement of the bar 94 with the right hand switch arm 31 will close the switch and energize the motor to start the pump 34 operating. The liquid will then be drawn from the receptacle through the hose 75 into the valve port 55 and pass through the valve port 49 to the pump to be returned by the pump to the lower inlet port 61 of the valve to pass through the passage 66 and upwardly into the tank inlet pipe 107 for discharge through the apertures 109 above the filter cartridge in the tank. After all of the liquid has been drawn from the receptacle and introduced into the tank 98 above the filter cartridge the valve may be closed by moving the handle bar 94 to the middle position shown in Fig. 6 while the cooking or other receptacle is being suitably cleaned after which by replacing the nozzle 78 into the receptacle the liquid may be filtered and returned into the receptacle in the following manner.

The handle bar 94 is swung to the far left as shown in Fig. 7 where it will close the switch to energize the electric motor and the pump will then function to pull the liquid through the filter cartridge in the tank into the area below the cartridge and between the same and the bottom wall 104 and then withdraw the liquid by way of the outlet nozzle 110, the outlet passage 56 and the port 49. From the pump the liquid will be returned to the valve port 61 and flow into the transverse slot 96 in the valve plug and then upwardly along the channel 97 to the valve port 55 to be returned through the tube to the receiving receptacle, being discharged thereinto through the nozzle 78.

While the foregoing description has included a reference to drawing the oil or other liquid in through the hose nozzle 78 and the hose 75 and discharging it into the tank 98 above the filter cartridge it will also be apparent that the oil or other liquid to be filtered may be poured directly into the tank through the top thereof after which it can be drawn off as needed, by operating the pump and setting the valve in the proper position to extract the liquid through the outlet nozzle 110 for discharge through the hose in the manner previously set forth. Thus a large quantity of oil or other liquid can be accumulated in the tank from a number of different receptacles and the liquid can be withdrawn as needed and, as previously pointed out, as the pump operates to suck or draw the liquid from the area below the cartridge it will also pull the unfiltered liquid through the filtering material of the cartridge.

While, as previously pointed out, the filter of the present invention may be used any place where use is made of oils, greases or other liquids which are or should be purified at frequent intervals to keep the same in usable condition, it will be apparent that the structure will be especially valuable in sandwich shops or manufacturing establishments which make large quantities of potato chips, french fried potatoes or like foods either for serving directly to customers or for putting up in packages for sale in grocery and other stores. Also in many establishments deep fat frying of chicken and other foods in addition to potato chips and the like is carried out, where the filter may be used to advantage and also for straining and cleansing bacon grease or other greases which may be desired for later use.

We claim:

1. A filter structure comprising a tank, a flat filter cartridge disposed therein and having peripheral contact with the wall thereof dividing the tank into an upper unfiltered liquid receiving portion and a lower filtered liquid receiving portion, means whereby liquid to be filtered may be introduced into the first mentioned portion, an outlet for removing filtered liquid from the second mentioned portion, means for applying suction to the filtered liquid outlet to effect passage of the unfiltered liquid through the cartridge and to draw the filtered liquid through the outlet, conduit means connected with said suction means for conveying the drawn-off liquid away from the tank, said outlet including a nipple carried by and extending down from the bottom of the tank, said means for introducing unfiltered liquid into the first mentioned portion comprising a pipe carried by the tank and having an end extending through and down from the bottom of the tank and extending at its other end into an opening in the first mentioned portion, said suction applying means comprising a pump having inlet and outlet ports, a reversible valve having a port adapted to function selectively for intake and discharge, conduits connecting the valve with said nipple and said pipe end, other conduits connecting the valve with the pump inlet and outlet ports, means for operating the pump, and said conduit means being connected with said valve port.

2. The invention according to claim 1, wherein the conduits connecting the valve with the nipple and pipe end each has an upwardly opening end, and said nipple and pipe end each being formed for insertion into an upwardly opening conduit end to effect a liquid tight connection therewith.

3. A filter structure comprising a base, a pump thereon and having an inlet and an outlet, means for operating the pump, a reversible valve unit on the base including a body having a chamber therein and a valve plug in the chamber, a port in communication with the chamber adapted to function selectively as an intake and discharge, conduits leading from said chamber and each terminating in an upwardly opening socket, a conduit connecting said chamber with the pump intake, another conduit connecting the pump outlet with said chamber, a liquid receptacle, means supporting the receptacle over said pump and valve unit, a filter cartridge within the receptacle and formed to partition the receptacle into an upper unfiltered liquid portion and a lower filtered liquid portion, an inlet pipe having one end discharging into the upper portion and another end extending down from the bottom of the receptacle, an outlet nipple leading from the lower portion and having a lower end directed down from the receptacle bottom, said other end of the inlet pipe and said lower end of the nipple each being formed and positioned for slip coupling with and in one of said sockets, said plug having fluid passages therein, said passages in one open position of the plug being positioned to close the conduit which is connected with the socket with which the nipple is connected and establish communication between said port and the socket having the end of the inlet pipe connected therein and the passages in the other open position of the plug establishing communication between the conduit leading to the socket with which the nipple is connected and said port and shutting off communication between said port and the said socket having the end of the inlet pipe connected therein, and means for placing said plug in either of said positions.

4. The invention according to claim 3, wherein said filter cartridge is in the form of a flat disc having a central opening therethrough and said inlet pipe rises in the the center of the receptacle and passes through and has tight frictional contact with the edge of the opening in the filter cartridge.

5. The invention according to claim 3, wherein said means for placing the valve plug in the closed position and said open positions comprises a handle bar positioned to swing in an arc adjacent to said base, said means for operating the pump comprising an electric motor, a pair of normally open switches for controlling the flow of electric current from a source of supply to the motor, said switches being positioned on opposite sides of the valve handle bar in position where one or the other is closed to energize the motor when the handle bar is moved to either of the valve open positions.

6. In a liquid filter, a base having a top surface, a body secured upon said surface and including two liquid conduits each terminating in an upwardly opening port, a liquid tank having a bottom, side wall and top, means carried by and extending downwardly from and below the bottom of the tank and removably supporting the tank on the surface of said base over said body, a liquid outlet nipple carried by the tank bottom and directed downward therefrom, a relatively long inlet pipe disposed vertically in the tank and having a portion of one end passing through and extending below the tank bottom, said outlet nipple and pipe having their lower ends spaced the same distance apart as said upwardly opening ports and removably socketed in the ports when the tank is supported on the base, a filter within and horizontally partitioning the tank into upper and lower liquid chambers and snugly encircling said pipe, said pipe having an opening for discharging liquid into the upper chamber, the filter being disposed below said pipe discharge opening, and means for introducing liquid into one conduit to flow therefrom into the upper chamber and for withdrawing liquid from the other chamber through the other conduit.

7. A liquid filter according to claim 6, wherein each of said ports has an annular gasket therein and the lower end of the nipple and of the pipe being tapered to enter a port and form a sealing connection with a gasket.

8. A liquid filter according to claim 6, wherein said body includes as a part thereof a rotary plug reversing valve having a two-way port and two pump ports, a unidirectional pump on the top of said base having an intake connected with one pump port and an outlet connected with the other pump port, and said plug having two operating positions and functioning when in one position to direct the flow of liquid by way of the pump inward from the two-way port into said pipe and when in its other position directing the flow of liquid by way of the pump from the outlet nipple outwardly through the two-way port, and motor means on the base connected with the pump for operating the latter.

9. The invention according to claim 8 wherein said valve plug is positioned over the surface of the base to turn on a vertical axis, an operating lever attached to the plug and projecting beyond the side of the base for actuation, said motor being electrically operated, and normally open control switches supported on the base in positions relative to said lever whereby the lever will close one switch in either operating position of the plug.

10. A liquid filter according to claim 6 wherein said filter is in the form of a flat disc having a central axial tube slidably encircling said pipe and a gasket within the tube in tight encircling contact with the pipe.

11. In a portable filter structure embodying a wheeled platform carrying liquid pumping and flow directing mechanism, a filter structure mounted on and removable as a unit from the platform, said filter structure comprising a tank, a skirt encircling the bottom part of the tank and extending downwardly therefrom, the skirt and platform being of substantially the same diameter, means on the platform for maintaining the skirt in supported position thereon and enclosing said mechanism, a pipe nipple carried by and depending from the bottom of the tank and opening thereinto, a pipe rising vertically in the tank and having a terminal portion projecting through and below the tank bottom, said pipe having communication at its upper end portion with the interior of the tank, a substantially flat filter disc in the tank encircling the pipe and partitioning the tank into upper and lower chambers, the tank having an open top and a cover removably positioned thereon, the filter disc being removable through said open top, and means whereby a fluid coupling is automatically effected between said pumping and flow directing mechanism and the depending ends of the nipple and pipe upon the mounting of the filter structure on the platform.

12. A portable filter structure according to claim 11 wherein said tank has a downwardly bowed bottom wall, said filter disc including a central sleeve formed to slide on and snugly engage said pipe whereby the filter is positionable for use anywhere along the major portion of the length of the pipe, and said filter being limited in its downward movement on the pipe by engagement of the periphery thereof with the perimeter of said bowed bottom wall.

References Cited in the file of this patent

UNITED STATES PATENTS

| | | |
|---|---|---|
| 729,693 | Steinkoenig | June 2, 1903 |
| 1,468,707 | Johnston | Sept. 25, 1923 |
| 1,506,652 | Maker | Aug. 26, 1924 |
| 1,784,892 | Duden | Dec. 16, 1930 |
| 1,872,430 | Ericson | Aug. 16, 1932 |
| 2,020,350 | Bertschinger | Nov. 12, 1935 |
| 2,124,798 | Schuler | July 26, 1938 |
| 2,151,538 | Swanson | Mar. 21, 1939 |
| 2,280,892 | Cowles | Apr. 28, 1942 |
| 2,312,091 | Gray | Feb. 23, 1943 |
| 2,473,986 | Booth | June 21, 1949 |
| 2,530,198 | Harvuot | Nov. 14, 1950 |
| 2,537,898 | Hunter et al. | Jan. 9, 1951 |
| 2,540,229 | Alessandro | Feb. 6, 1951 |
| 2,656,929 | Dolan | Oct. 27, 1953 |